United States Patent
Kieltyka et al.

(10) Patent No.: US 6,756,003 B2
(45) Date of Patent: Jun. 29, 2004

(54) METHOD OF ATTACHING THERMOPLASTIC ATTACHMENTS TO A SUBSTRATE

(75) Inventors: Kevin Allen Kieltyka, Rochester, MI (US); DuWayne Scott McDowell, Greenwood, MI (US); Joseph C. Bonafiglia, Langhorne, PA (US); Srinivas Vasu Kotha, Sterling Heights, MI (US); Sudesh B. Appaji, Troy, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 59 days.

(21) Appl. No.: 10/090,503

(22) Filed: Mar. 4, 2002

(65) Prior Publication Data

US 2003/0164577 A1 Sep. 4, 2003

(51) Int. Cl.[7] .......................... B29C 45/14; B29C 65/72
(52) U.S. Cl. ................ 264/254; 264/255; 264/257; 264/266; 264/275; 264/294; 264/319
(58) Field of Search ................ 264/250, 254, 264/255, 257, 259, 265, 266, 267, 275, 294, 319; 425/112, 125, 128, 129.1, 130

(56) References Cited

U.S. PATENT DOCUMENTS

| | | |
|---|---|---|
| 4,347,276 A | 8/1982 | Weber et al. |
| 4,546,022 A | 10/1985 | Madonia et al. |
| 4,668,460 A * | 5/1987 | Ongena ................ 264/255 |
| 4,753,586 A | 6/1988 | Curtis |
| 4,810,452 A | 3/1989 | Taillefert et al. |
| 5,053,179 A | 10/1991 | Masui et al. |
| 5,076,880 A | 12/1991 | Spengler et al. |
| 5,089,206 A | 2/1992 | Kia |
| 5,091,131 A | 2/1992 | Schumacher et al. |
| 5,200,252 A | 4/1993 | Kelman |
| 5,224,299 A | 7/1993 | Abe |
| 5,225,135 A | 7/1993 | Kia |
| 5,292,465 A | 3/1994 | Kobayashi et al. |
| 5,304,273 A | 4/1994 | Kenrick et al. |
| 5,387,391 A | 2/1995 | Satoh et al. |
| 5,397,409 A | 3/1995 | Kornylo |
| 5,429,786 A * | 7/1995 | Jogan et al. ................ 264/255 |
| 5,474,841 A | 12/1995 | Matsuki et al. |
| 5,525,283 A | 6/1996 | Nicolay |
| 5,531,499 A | 7/1996 | Vecchio et al. |
| 5,582,789 A | 12/1996 | Stein et al. |
| 5,672,403 A | 9/1997 | Hara et al. |
| 5,679,301 A * | 10/1997 | Miklas et al. ................ 264/161 |
| 5,695,865 A | 12/1997 | Shimizu |
| 5,759,661 A | 6/1998 | Ang et al. |
| 5,804,117 A | 9/1998 | Baba et al. |
| 5,824,251 A | 10/1998 | Morrison et al. |
| 5,902,533 A | 5/1999 | Munger et al. |
| 5,932,331 A | 8/1999 | Jones et al. |
| 5,976,646 A | 11/1999 | Stevens et al. |
| RE36,457 E | 12/1999 | Ellison et al. |
| 6,033,770 A | 3/2000 | Matsuki et al. |
| 6,034,165 A | 3/2000 | Tomomatsu et al. |
| 6,063,460 A | 5/2000 | Souders et al. |
| 6,093,272 A | 7/2000 | Visconti et al. |
| 6,093,365 A | 7/2000 | D'Hooren |
| 6,096,256 A | 8/2000 | Aretz |
| 6,136,415 A | 10/2000 | Spengler |
| 6,149,853 A * | 11/2000 | Luckett et al. .............. 264/266 |
| 6,196,607 B1 | 3/2001 | Gulisano |
| 6,537,669 B1 * | 3/2003 | Kaufmann ................ 428/411.1 |

* cited by examiner

*Primary Examiner*—Angela Ortiz
(74) *Attorney, Agent, or Firm*—Brinks Hofer Gilson & Lione

(57) ABSTRACT

The present invention generally relates to interior trim parts such as door panels that are attached to an interior sheet in a motor vehicle. In accordance with the preferred embodiment of the present invention, a method of forming the trim part having an outer surface and an inner surface is disclosed. The method comprises providing a substrate having a first side and a second side and disposing the substrate in a molding tool, the molding tool has an upper mold and a lower mold. Engaging the first side of the substrate with the upper mold and the second side of the substrate with the lower mold. The first side is subject to compression molding such that the first side forms the outer surface of the trim part and injection molding an attachment surface to the second side of the substrate.

12 Claims, 2 Drawing Sheets

METHOD OF ATTACHING THERMOPLASTIC ATTACHMENTS TO A SUBSTRATE

TECHNICAL FIELD

This invention generally relates to a trim parts installed in the interior of a motor vehicle. More specifically to a trim part having an attachment surface and a method of forming the attachment surface on the trim part.

BACKGROUND

Automotive interior molded panel components, such as trim part inserts such as door panels, are typically manufactured with a covered substrate and with backside attachment methods for sheet metal. The sheet metal is then attached to other components of the trim part. Typically, these door panels are made by compression molding a substrate to the desired form of the door panel. With the use of compression molding techniques, it is very difficult to mold in the backside the attachment points.

Therefore, in order to attach these attachment points at the back of the substrate forming the door panel, a two step process is involved where these attachment points are purchased components and are assembled to the substrate by means of placing/locating each attachment piece into the molding tool before the molding process. Alternatively, these attachment tools are attached after removing the substrate from the molding tool and fastening the attachment by secondary operations such as heat staking, sonic welding, vibration welding or with the help of an adhesive. However present methods used to secure these attachments entail additional product cost, therefore, adding to the overall cost of the automobile. In some cases, over time, these attachments points contribute to the degradation in the noise, vibration and harshness (NVH) characteristics of an automobile.

Hence, there is a need in the automotive industry to manufacture door panels that have integrated attachment points that will reduce the overall cost and manufacturing time of a door panel.

SUMMARY

The present invention generally relates to interior trim parts such as door panels that are attached to an interior sheet in a motor vehicle. In accordance with the preferred embodiment of the present invention, a method of forming the trim part having a outer surface and an inner surface is disclosed. The method comprises providing a substrate having a first side and a second side and disposing the substrate in a molding tool, the molding tool has an upper mold and a lower mold. Engaging the first side of the substrate with the upper mold and the second side of the substrate with the lower mold. The first side is subject to compression molding such that the first side forms the outer surface of the trim part and injection molding an attachment surface to the second side of the substrate.

BRIEF DESCRIPTION OF THE DRAWINGS

Further features and advantages of the invention will become apparent from the following discussion and the accompanying drawings in which.

DETAILED DESCRIPTION

The following description of the preferred embodiment is merely exemplary in nature and is in no way intended to limit the invention or its application or uses.

Figure 1:
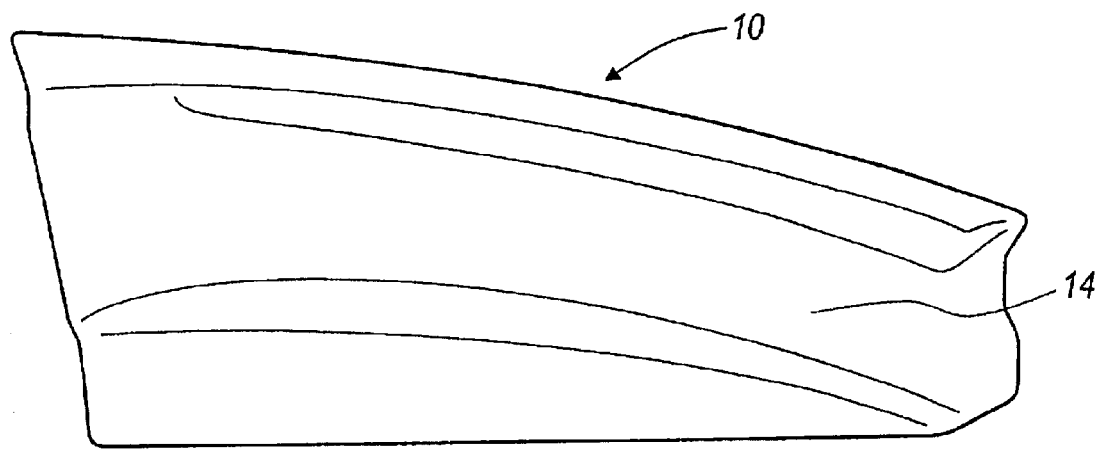
FIG. 1 is front view of the trim part.

Referring in particular to FIG. 1, a trim part such as a door panel incorporating the features of the present invention is generally shown and represented by reference numeral 10. The trim part 10 is typically mounted to a door of a motor vehicle (not shown). It must be appreciated, although a trim part is shown and explained in details this invention, this invention may be applied to any other panel or any molded, or otherwise formed, product used in a motor vehicle made of the materials, or variations of the materials, such as an instrument panel.

Figure 2:
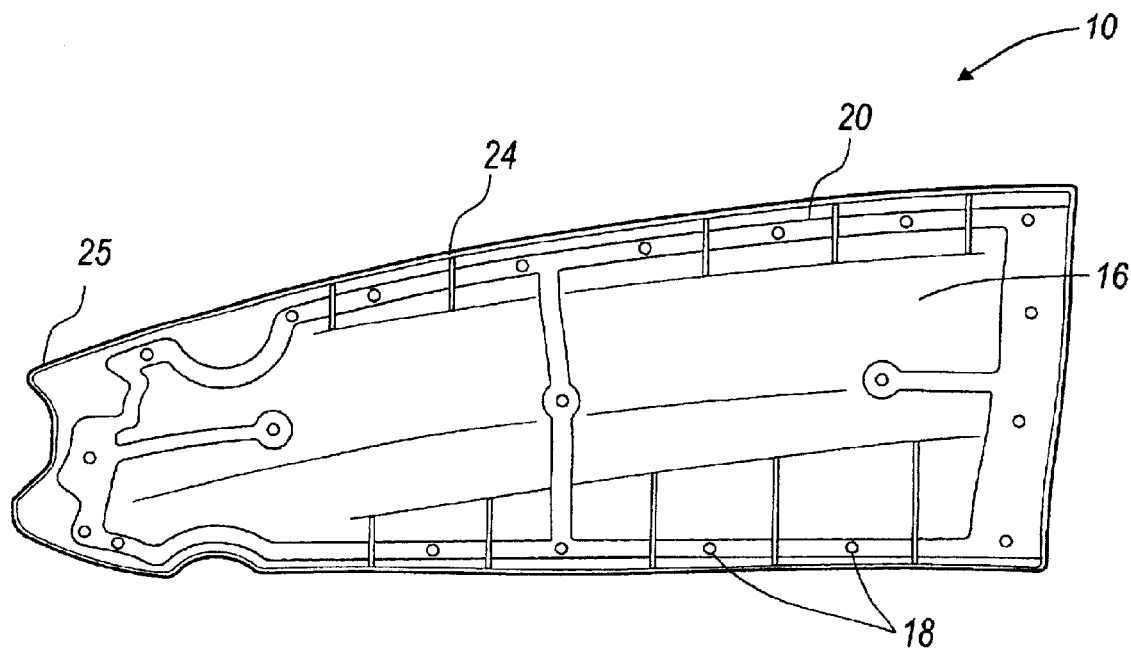
FIG. 2 is a back view of the trim part showing the attachment points I accordance with the teachings of the present invention.

Referring in particular to FIGS. 1 and 2, the trim part 10 extends in a longitudinal and vertical direction and generally has a rectangular shape. The trim part 10 comprises a first surface or an outer surface 14 (as shown in FIG. 1) and a second surface or an inner surface 16 (as shown in FIG. 2). In this application, the outer surface 14 refers to the surface of the trim part 10 exposed to the interior of the motor vehicle. The inner surface 16 refers to the surface of the trim part attached to other components of a motor vehicle door such as metal sheet etc.

In order to create a Class "A" surface, the first surface 14 of the trim part 10 is covered with an aesthetically pleasing material such as cloth, leather or a plastic cover. The trim part 10 Is typically made of a Natural Fiber/thermoplastic composite or a Woodstock/Thermoplastic composite material. The second surface 16 of the trim part 10 comprises an attachment surface 20. Preferably, the attachment surface 20 is molded to the second surface 16 of the trim part. The attachment surface 20 extends all around the periphery 25 of the second surface 16. Alternatively, It possible to mold the attachment surface on one side of the second surface 16. The attachment surface 20 is recessed at various locations to form heat stake boss 18 and locating boss 22. The heat stake boss 18 and locating boss 22 extend from the attachment surface 20 such that trim part 10 can be attached to a metallic sheet with the help of the heat stake boss 18 and locating boss 22. Additionally, the second surface 16 is also provided with ribs 24 to strengthen the trim part 10. The ribs 24 as shown extend vertically from the periphery 25 of the trim part 10 perpendicular to the attachment surface 20. Preferably, the ribs 24 are formed adjacent to the heat stake boss 20 and locating boss 22. The method of forming the trim part 10 having the attachment surface 20 is now explained in details.

Figure 3:
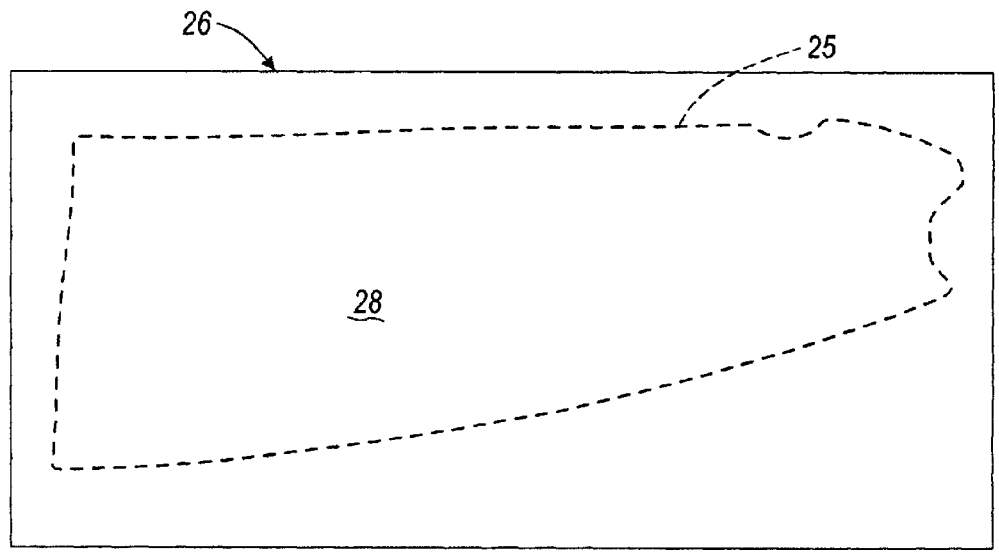
FIG. 3 is a front view of a substrate used to form the trim part in accordance with the teachings of the present invention.
Figure 4:
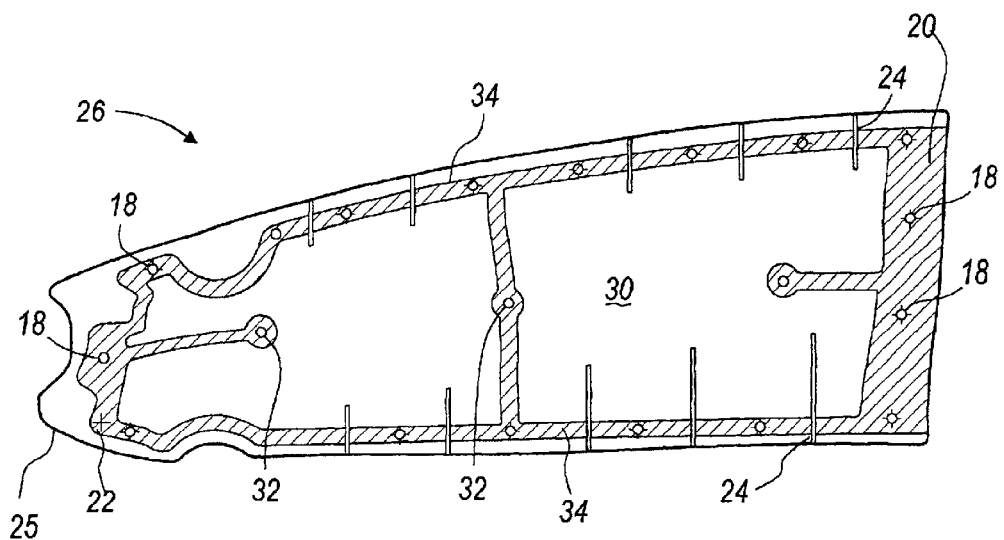
FIG. 4 is a cross sectional view of the substrate with the gate and surface runners in accordance with the teachings of the present invention.

Referring in particular to FIGS. 3 and 4, a substrate 26 made of either Natural Fiber/Thermoplastic composite or a Woodstock/Thermoplastic composite material, is cut into desired shape of the trim part 10 as shown by dotted lines 25. Preferably, the substrate 26 takes the shape of the trim part 10 during the compression molding process. The substrate 26 defines an upper surface 28 and a lower surface 30 opposite the upper surface 28. As will be explained later, the upper surface 28 and the lower surface 30 of the substrate 26 will form the first surface 14 and the second surface 16 of the trim part 10 respectively. The substrate 26 is then pre-heated to a temperature of about 380° F. to 410° F. The heating process brings the thermoplastic portion of the composite to a suitable temperature at which molding can be achieved.

The heated substrate 26 is then placed in a molding tool (not shown). The molding tool is conventional in the art and therefore is not explained in great detail. Typically, the molding tool comprises an upper mold and a lower mold. The upper mold and the lower mold define a cavity having the dimensions of the trim part 10. The molding tool is attached to actuators that move the upper mold and the lower mold either towards each other or away from each other. As the upper mold and the lower mold move towards each other the cavity defines the shape of the trim part 10.

Substrate 26 is placed inside the molding tool and the molding tool is closed such that the upper mold and the lower mold move towards each other. As the molding tool is closed, upper surface 28 of the substrate 26 is in contact or engages with the upper side of the cavity defined by the upper mold in the molding tool. Similarly, the lower surface 30 of the substrate 26 is in contact or engages with the lower side of the cavity defined by lower mold. The molding tool used in this invention is such that the upper and the lower mold can be subject to independent process.

The upper mold is subject to compression molding process. The compression molding process is well known in the art and is not explained in detail. Briefly stated, the upper mold is subject to a high compressive force generated by using hydraulic pressure or any other means of actuation. For example, the pressure may be exerted using a vacuum or any other means. While the pressure is being exerted on the upper mold, the upper surface 28 of the substrate 26 is being compressed and takes the shape of the upper part of the cavity. Therefore, the upper surface 28 of the substrate 26 is formed by compression molding process. As the upper surface 28 is being subject to compression, the lower mold and the lower surface 30 of the substrate 26 are subject to injection molding to form the attachment surface 20. Preferably, injection molding of the lower surface 30 of the substrate 26 is carried out at the same time the upper surface 28 is subject to compression molding. The injection molding process is well know in the industry and is not explained in details In order to form the attachment surface 20 by injection molding the lower surface 30 of the substrate 26, the lower mold is provided with at least one gate 32. The gate 32 is in form of a cavity defined in the lower mold from where the thermoplastic or a thermoset resin such as, a polypropylene or nylon resin, is introduced into the lower surface 30 of the substrate 26. The impression of the gate 32 remains on the lower surface 30 of the substrate 26 after the substrate 26 is removed from the molding tool. In order to direct the flow of the resin into the lower surface 30 of the substrate 26 the gate 32 is connected to a number of surface runners 34. The surface runner 34 is preferably a channel cut into the surface of lower mold such that the resin flows along the periphery 25 of the substrate 26 to form the attachment surface 20. The surface runner 34 substantially prevents any flow of the resin inside of the lower mold.

The injection molding of the lower surface 30 of the substrate 26 is accomplished by having limited multiple injection points into the lower surface 30 of the substrate 26 with the help of the surface runner 34. The surface runners 34 used in the present invention direct the molten resin to form the attachment surface 20 having heat stake boss 18 and locating boss 22 and the ribs 24 on the lower surface of the substrate 26. After the resin has been injected into the lower surface 30, the resin is cured such that the attachment surface 20 and ribs 24 are molded on to the lower surface 30 of the substrate 26.

As described above, the substrate 26 after undergoing simultaneous compression molding and injection molding forms the trim part 10 having a first surface 14 and a second surface 16. The second surface 16 has an attachment surface 20 that is formed during the molding process. This method of injection molding the second surface 16 of the trim part 10 eliminates the need to subject the substrate forming the trim part 10 to two different processes at different times to form the attachment surface 20. Additionally, it also eliminates the need for separate molding tools.

As any person skilled in the art will recognize from the previous description and from the figures and claims, modifications and changes can be made to the preferred embodiment of the invention without departing from the scope of the invention as defined in the following claims.

What is claimed is:

1. A method of forming a trim part having an outer surface exposed to an interior of a motor vehicle and an inner surface for attaching the trim part to an interior sheet in a motor vehicle, the method comprising:

providing a substrate having a first side, a second side, and a periphery connecting the first side and the second side;

disposing the substrate in a molding tool, wherein the molding tool has an upper mold and a lower mold;

engaging the first side of the substrate with the upper mold;

engaging the second side of the substrate with the lower mold;

compression molding the first side of the substrate such that the first side forms the outer surface of the trim part;

injection molding an attachment surface to the second side of the substrate such that the second side forms the inner surface of the trim part, the attachment surface continuously extending along the second side of the substrate adjacent to the periphery of the substrate, wherein the attachment surface has at least one attachment boss extending from the attachment surface to attach the trim part to the interior sheet.

2. The method of claim 1 further comprising the step of:

providing a gate on the lower mold;

attaching at least one surface runner to the gate;

injecting a resin through the gate into the surface runner;

directing the flow of the resin through the surface runner to the second side of the substrate;

forming the attachment surface by injection molding the resin on the second side of the substrate.

3. The method of claim 2 further comprising curing the resin to form the attachment surface extending from the second side to attach the trim part to the interior sheet.

4. The method of claim 2 wherein the resin is a polypropylene resin.

5. The method of claim 1 wherein the attachment surface extends along a periphery of the second side of the substrate.

6. The method of claim 1 further comprising injection molding ribs on the second side of the substrate, the ribs extending perpendicular to the attachment surface.

7. The method of claim 6 further comprising forming the ribs adjacent to the attachment boss on the second side of the substrate.

8. The method of claim 1 further comprising selecting the substrate from a group consisting of natural fiber/thermoplastic composite are woodstock/thermoplastic composite material.

9. The method of claim 1 further comprising the step of pre-heating the substrate to a temperature in the range of 380° F. to 410° F. before disposing the substrate on to the molding tool.

10. The method of claim 1 further comprising simultaneously compression molding the first side of the substrate and injection molding the attachment surface on the second side of the substrate.

11. The method of claim 1 wherein the at least one attachment boss includes at least one locating boss and at least one heat stake boss extending from the second side to attach the turn part to the interior sheet.

12. The method of claim 1 wherein at least one of the at least one attachment boss has a substantially circular cross-section.

* * * * *